: 2,827,388
Patented Mar. 18, 1958

2,827,388

ALUMINUM DIPPING ENAMEL, AND ARTICLE COATED THEREWITH

John P. Mayer, Cleveland, and Miris D. Wright, Lakewood, Ohio, assignors to The Glidden Company, Cleveland, Ohio, a corporation of Ohio No Drawing. Application June 25, 1954
Serial No. 439,466

12 Claims. (Cl. 106—290)

This invention relates to an improved aluminum dipping enamel as a novel composition of matter, and to articles coated therewith.

Aluminum finishes have been used in the past for many purposes, and brushing and spray coatings having aluminum flake as the principal pigment are well known. Conventional aluminum finishes have been applied by dipping, but preferably in connection with articles whose shape was such that flow could be uniformly controlled. When the shape of the dipped article is such that the finish tends to accumulate, as in a recess, and then to flow out over other areas where the finish has already drained and started to set, then the flow of the accumulated finish over the other area causes a readily apparent streak or blemish due to a difference in the leafing pattern or build up of the aluminum. For this reason, the coating of articles with aluminum finishes by dipping has heretofore been unsatisfactory. Much effort has been expended in the past in attempts to overcome the difficulties described above, but to the best of our knowledge such efforts have been of limited success. Aluminum finishes are also recognized to smudge the fingers when handled. This is due to the fact that in a leafing-type finish such as these, the individual plates or flakes of aluminum float to the surface of the coating and carry little or no protecting binder. Consequently, when the dry finish is handled, part of these loosely-bound flakes are removed and appear on the fingers as a smudge.

We have now discovered that aluminum finishes formulated in accordance with the principles hereinafter set forth can be applied successfully by dipping and regardless of the shape of the article being dipped, apply a durable coating of uniform appearance and good smudge resistance.

Accordingly, the main object of this invention is to provide a novel aluminum coating composition particularly adapted for application by dipping, but useful also as a general protective coating.

This and other objects will be apparent from the following description of the invention.

The problem of avoiding a streaked and blemished finish on articles dipped in aluminum coating compositions has been one of much interest and importance in certain segments of the coating art. Many expedients have been tried and much ingenuity has been exercised in seeking an answer to the problem. We have now discovered, however, that the problem can be solved successfully by employing a particular class of film-forming materials as the sole or principal film-forming material. We are presently unable to give the reason(s) why these materials solve the problem, so we can only explain the invention in terms of the kinds and proportions of materials which provide the solution thereto.

The film-forming materials in our formulations are of the hydrocarbon drying oil class, and are of the polymeric $C_4$–$C_6$ conjugated diolefin homopolymer and/or $C_4$–$C_6$ diolefin-styrene copolymer types which have been polymerized in solvent in the presence of sodium or other alkali metal as the polymerization catalyst. Polymeric hydrocarbon drying oils which we have found to be useful in the present invention are described in U. S. Patents 2,264,811, 2,559,947, 2,631,175, 2,636,910, 2,652,342, 2,669,526 and 2,672,425. Any of these drying oils and mixtures thereof can be employed in the present invention, but we prefer the butadiene-styrene oils of U. S. Patents 2,559,947 and 2,652,342 and we especially prefer the modified butadiene-styrene drying oils of the latter patent. The oils corresponding to that patent are oily sodium copolymers having an intrinsic viscosity between about 0.15 and 0.3 and are composed of the following ingredients in the combined state:

75–90% butadiene
25–10% styrene
.01–2.5% of an anhydride selected from the group consisting of maleic, chloromaleic and citraconic anhydrides It will be understood that our present preference for the butadiene-styrene copolymer drying oils extends to any of this class of oil containing between about 10% and 50% of styrene, whether modified or not with maleic anhydride or the related anhydrides. We have also discovered, however, that such oils as well as those of U. S. Patents 2,650,209 and 2,631,175 can be mixed with other film-forming materials such as drying oils, bodied glyceride oils, and/or epoxidized glyceride oils. Mixtures of hydrocarbon drying oils with epoxidized glyceride oils are described and claimed in the copending application of Tulk and Neuhaus, Serial No. 589,854, filed June 7, 1956. Where used, the additives here mentioned preferably amount to about 5% by weight on the total film-forming material in the mixture. The use of 5% linseed oil in our butadiene-styrene-maleic drying oil dipping enamel imparts improved stripping properties, a factor of importance in dipping practice.

The film-forming components of the present invention can be pigmented with aluminum pigment of the leafing type in any desired amount. Preferably, however, the pigment:binder ratio is kept such that finished coatings having the gloss of enamels are produced.

The total solids of our aluminum coatings can be varied considerably by employing volatile hydrocarbon solvent(s) of the aliphatic, predominantly aromatic and/or fully aromatic types. Driers are not necessary, but can be added if desired, particularly when accelerated air-drying is desired. When driers are used, they can be of the peroxide type or metallic drier type. Cobalt octoate or naphthenate is especially effective. The use of certain driers is described and claimed in the copending application of Kiebler, Zier and Baumhart, Serial No. 377,242, filed August 28, 1953. The coatings of this invention can be effectively cured by baking either with or without driers. Baking temperatures of 250–400° F. are useful.

The following examples illustrate the principles of our invention.

*Example 1*

Bodied butadiene (79.5%)-styrene (19.5%)-1% maleic anhydride copolymer hydrocarbon drying oil prepared in accordance with U. S. Patent 2,652,342 and having a total solids content of 60% in mineral spirits with U–V viscosity (Gardner) _____ pts__ 11 11/16
Mineral spirits_____ pts__ 5/16
Solvent naphtha (coal tar)_____ pts___ 2
Hydrogenated naphtha [1] _____ pts___ 4
Aluminum paste [2] _____ lbs__ 1.5

[1] A commercial product of the Shell Company containing about 80% aromatics, 5% naphthenes, and 13% paraffines, and having a boiling range of 380° F. (initial) to 412° F. (50%) and an end point of 500° F., a specific gravity of .892 at 60/60° F., a closed cup flash point of 158° F. (Tag), a mixed aniline point of 84° F., and a Kauri butanol value of 73; commercially identified as E-407-R solvent.
[2] A commercial product of the Reynolds Company and identified as No. 47 aluminum paste.

The above materials were made into a coating composition by mixing them together thoroughly. The finished composition had a weight per gallon of 7.81 lbs. and a viscosity (full body) of 19 seconds on a Zahn No. 2 viscosimeter. The coating was applied at full body to various articles by dipping, allowing a 12 minute drip time followed by an 11 minute bake at 350° F. The coated articles, even when of complex shape, exhibited excellent uniformity of appearance and excellent resistance to smudging.

*Example 2*

The coating of Example 1 was modified by adding linseed oil thereto in an amount corresponding to 5% by weight on the butadiene-styrene-maleic copolymer drying oil. The modified coating retained its desirable appearance and non-smudging features but in addition could be stripped on a commercial basis from the conveyor hooks carrying dipped parts into and from the dipping tank. Unless stripped periodically from the hooks, the coating builds up to such a thickness as to interfere with the operation of the conveyor and dip-tank.

*Example 3*

The copolymer of Example 1 was replaced with a sodium-catalyzed unbodied homopolymer of butadiene of the type prepared in accordance with U. S. Patent No. 2,631,175. The resulting coating, after being applied by dipping and cured by baking, exhibited a good uniform appearance free of streaking.

*Example 4*

The copolymer of Example 1 was replaced with an unbodied copolymer prepared from 50% butadiene and 50% styrene by a process conforming to that of U. S. Patent 2,636,910. The composition yields substantially the same good results obtained in Example 1.

Having now described our invention, what we claim is:
1. An improved aluminum dipping enamel composed essentially of: (A) an organic solvent solution of film-forming material composed essentially of alkali-metal-catalyzed, solvent-polymerized, hydrocarbon drying oil selected from the class consisting of $C_4$–$C_6$ conjugated diolefin homopolymers, copolymers composed essentially of 50–90% $C_4$–$C_6$ conjugated diolefins and 50–10% styrene, and mixtures thereof; and (B) leafing aluminum pigment dispersed in said vehicle in amounts at least sufficient to provide hiding in an applied film thereof.
2. A coating composition as claimed in claim 1 wherein the film-forming vehicle is composed essentially of a butadiene-styrene copolymer.
3. A coating composition as claimed in claim 2 wherein the butadiene-styrene copolymer is modified with from .01 to 2.5% of an anhydride selected from the class consisting of maleic, chloromaleic and citraconic anhydrides.
4. A coating composition as claimed in claim 3 wherein the said modifier is maleic anhydride.
5. A coating composition as claimed in claim 4 wherein said composition includes in the film-forming vehicle thereof up to about 5% triglycerides selected from the class consisting of drying oils, bodied triglyceride oils, epoxidized glyceride oils, and mixtures thereof.
6. A coating composition as claimed in claim 5 wherein said triglyceride oil is linseed oil.
7. A coating composition as claimed in claim 1 wherein said composition includes in the film-forming vehicle thereof up to about 5% triglycerides selected from the class consisting of drying oils, bodied triglyceride oils, epoxidized glyceride oils, and mixtures thereof.
8. A coating composition as claimed in claim 7 wherein said triglyceride oil is linseed oil.
9. An article of manufacture having a surface portion thereof which when coated with liquid coating composition by dipping does not drain evenly, said surface having been coated with an aluminum-pigmented protective film by dipping said article in an enamel composition as claimed in claim 1 and then drying the retained composition, thereby providing on said article a coating having a uniform appearance free from blemishes customarily caused heretofore by uneven draining and flow of aluminum-pigmented wet coating material from the article.
10. An article of manufacture having a surface portion thereof which when coated with liquid coating composition by dipping does not drain evenly, said surface having been coated with an aluminum-pigmented protective film by dipping said article in an enamel composition as claimed in claim 6 and then drying the retained composition, thereby providing on said article a coating having a uniform appearance free from blemishes customarily caused heretofore by uneven draining and flow of aluminum-pigmented wet coating material from the article.
11. An article of manufacture having a surface portion thereof which when coated with liquid coating composition by dipping does not drain evenly, said surface having been coated with an aluminum-pigmented protective film by dipping said article in an enamel composition as claimed in claim 7 and then drying the retained composition, thereby providing on said article a coating having a uniform appearance free from blemishes customarily caused heretofore by uneven draining and flow of aluminum-pigmented wet coating material from the article.
12. An improved aluminum dipping enamel composed essentially of: (A) an organic solvent solution of film-forming material composed essentially of alkali-metal-catalyzed, solvent-polymerized hydrocarbon drying oil selected from the class consisting of $C_4$–$C_6$ conjugated diolefin homopolymers, copolymers composed essentially of 50–90% $C_4$–$C_6$ conjugated diolefins and 50–10% styrene, and mixtures thereof; and (B) leafing aluminum pigment dispersed in said vehicle in amounts at least sufficient to provide hiding in an applied film thereof, said dipping enamel having a total solids content of about 22.6% by weight and having a ratio of copolymer solids to pigment solids of about 43.8 to 56.2.

References Cited in the file of this patent

UNITED STATES PATENTS

| | | |
|---|---|---|
| 2,441,945 | Frolich et al. | May 25, 1948 |
| 2,652,342 | Gleason | Sept. 15, 1953 |
| 2,662,027 | Pike | Dec. 8, 1953 |
| 2,669,526 | Koenecke et al. | Feb. 16, 1954 |